(12) United States Patent
Yu

(10) Patent No.: US 8,908,563 B2
(45) Date of Patent: Dec. 9, 2014

(54) METHOD FOR ACQUIRING INFORMATION, USER EQUIPMENT, AND NETWORK EQUIPMENT

(75) Inventor: Yijun Yu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 458 days.

(21) Appl. No.: 12/886,281

(22) Filed: Sep. 20, 2010

(65) Prior Publication Data

US 2011/0007671 A1 Jan. 13, 2011

Related U.S. Application Data

(63) Continuation of application No. PCT/CN2009/070917, filed on Mar. 20, 2009.

(30) Foreign Application Priority Data

Mar. 21, 2008 (CN) .......................... 2008 1 0065880

(51) Int. Cl.
*H04L 12/28* (2006.01)
*H04L 29/12* (2006.01)
*H04W 76/02* (2009.01)

(52) U.S. Cl.
CPC ...... *H04L 29/12207* (2013.01); *H04L 61/6086* (2013.01); *H04W 76/022* (2013.01); *H04L 61/2015* (2013.01); *H04L 29/12792* (2013.01); *H04L 61/20* (2013.01); *H04L 61/60* (2013.01); *H04W 76/021* (2013.01)
USPC .......................................................... 370/255

(58) Field of Classification Search
CPC . H04W 80/04; H04W 80/045; H04W 76/021; H04W 76/022; H04L 29/12207; H04L 29/12792; H04L 61/20; H04L 61/2015; H04L 61/6086; H04L 61/60
USPC ................................ 370/254, 255, 310, 310.2
See application file for complete search history.

(56) References Cited

U.S. PATENT DOCUMENTS 6,542,491 B1 *  4/2003  Tari et al. ...................... 370/338
7,630,341 B2 * 12/2009  Buddhikot et al. ........... 370/331
(Continued)

FOREIGN PATENT DOCUMENTS

CN     1475070 A     2/2004
CN     1859445 A    11/2006
(Continued)

OTHER PUBLICATIONS

Written Opinion of the International Searching Authority issued in corresponding PCT Patent Application No. PCT/CN2009/070917, mailed Jul. 2, 2009.

(Continued)

*Primary Examiner* — Chi H Pham
*Assistant Examiner* — Robert Lopata
(74) *Attorney, Agent, or Firm* — Huawei Technologies Co., Ltd

(57) ABSTRACT

A method for acquiring information includes: receiving an Internet Protocol (IP) address acquisition request or Packet Data Network (PDN) address allocation information sent by User Equipment (UE); determining a PDN address capability according to the IP address acquisition request or the PDN address allocation information; and sending the determined PDN address capability to the UE. An UE and network equipment are also provided. The PDN address capability is determined by the network and is sent to the UE, so as to indicate to the UE the IP address information that may be acquired in a current PDN connection, such that when the network cannot provide an IP address for the UE any more, the UE is prevented from acquiring other IP addresses in other manners, avoiding service abnormality.

15 Claims, 6 Drawing Sheets

(56) References Cited

U.S. PATENT DOCUMENTS

| | | | |
|---|---|---|---|
| 7,701,958 B2 | 4/2010 | Abrol | |
| 7,792,081 B2 | 9/2010 | Kim et al. | |
| 7,808,942 B2 * | 10/2010 | Bui et al. | 370/310.2 |
| 7,852,825 B2 | 12/2010 | Shaheen | |
| 7,860,067 B2 | 12/2010 | Na | |
| 8,223,731 B2 | 7/2012 | Lee et al. | |
| 8,254,276 B2 | 8/2012 | Hsu | |
| 2004/0184465 A1 | 9/2004 | Lee | |
| 2008/0285492 A1 * | 11/2008 | Vesterinen | 370/310 |

FOREIGN PATENT DOCUMENTS

| | | |
|---|---|---|
| CN | 1859777 A | 11/2006 |
| CN | 1905569 A | 1/2007 |
| CN | 101106579 A | 1/2008 |

OTHER PUBLICATIONS

Extended European Search Report issued in corresponding European Patent Application No. 09721991.9, mailed Sep. 16, 2011.

Global System for Mobile Communications, "3$^{rd}$ Generation Partnership Project; Technical Specification Group Services and System Aspects; General Packet Radio Service (GPRS) Enhancements for Evolved Universal Terrestrial Radio Access Network (E-UTRAN) Access" Release 8, 3GPP TS 23.401. V8.0.0, Dec. 2007.

"3$^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8)" 3GPP. Dec. 2007.

Partial Translation of Chinese Office Action of Chinese Patent Application No. 200810065880.5; mailed Mar. 11, 2010.

International Search Report issued in corresponding PCT Application No. PCT/CN2009/070917; mailed Jul. 2, 20009.

Office Action issued in commonly owned U.S. Appl. No. 13/619,172, mailed Nov. 5, 2012.

Office Action issued in corresponding Canadian Patent Application No. 2,718,962, mailed Oct. 31, 2012.

Office action issued in corresponding U.S. Appl. No. 13/619,172,dated Jun. 24, 2013,total 13 pages.

Office action issued in corresponding European application No. 09721991.9,dated Jul. 31, 2013,total 6 pages.

* cited by examiner

METHOD FOR ACQUIRING INFORMATION, USER EQUIPMENT, AND NETWORK EQUIPMENT

CROSS-REFERENCE TO RELATED APPLICATIONS

This application is a continuation of International Application No. PCT/CN2009/070917, filed on Mar. 20, 2009, which claims priority to Chinese Patent Application No. 200810065880.5, filed on Mar. 21, 2008, both of which are hereby incorporated by reference in their entireties.

FIELD OF THE TECHNOLOGY

The present disclosure relates to the field of communications, and more particularly to a method for acquiring information, User Equipment (UE), and network equipment.

BACKGROUND OF THE DISCLOSURE

In order to deal with challenges of wireless broadband technology and ensure the leading position of the 3rd Generation Partnership Project (3GPP) network, the 3GPP has initiated the Long Term Evolution (LTE) program. Under the guidance of the LTE program, a new architecture for mobile communication networks is defined, which is flatter than the existing General Packet Radio Service/Universal Mobile Telecommunications System (GPRS/UMTS), and only keeps a Packet Switched (PS) domain, and thus is called Evolved Packet System (EPS). No matter for the current GPRS/UMTS system, the upgraded Release-8 GPRS/UMTS system, or the EPS network being researched, User Equipment (UE) shall be registered into the network firstly, establish a Packet Data Protocol (PDP) context bearer or an EPS bearer, and acquire an Internet Protocol (IP) address in order to enforce PS service. The so-called PDP context bearer or EPS bearer is a logical tunnel for transmitting various service data streams. The UE connects to the specific application server in a Packet Data Network (PDN) for transmitting data packet via the bearer. Multiple bearers connected to the same PDN may be considered as one PDN connection. In a pre-Release-8 GPRS/UMTS system, the UE can only acquire one IP address per PDN connection; while in the Release-8 GPRS/UMTS or EPS, if the UE's capability and the network equipment's capability are allowed, the UE is able to acquire two IP addresses with different IP version, that is, an IP version 4 (IPv4) address and an IP version 6 (IPv6) address, per one PDN connection.

In the implementation of the present disclosure, the inventor finds that when the first bearer of one PDN connection is established, the UE may subsequently initiate a new process to acquire an IP address for the PDN connection, and the IP address may be an IP address with another version that has not been acquired by the UE, or a new IP address. As such IP address acquirement process requires that the UE and network equipment support certain related capabilities, it is possible that it will fail for the UE to apply for an IP address for one PDN connection when the network equipment does not allow the UE to acquire two IP addresses for the PDN connection, which results in resource waste, and even results in interruption of an ongoing service in the PDN connection.

SUMMARY OF THE DISCLOSURE

Accordingly, in one aspect, the present disclosure provides a method for acquiring information, which includes: receiving an IP address acquisition request or PDN address allocation information sent by a UE; determining a PDN address capability according to the IP address acquisition request or the PDN address allocation information; and sending the determined PDN address capability to the UE.

In another aspect, the present disclosure further provides a UE, which includes a first sending unit, configured to send an IP address acquisition request or PDN address allocation information to a network; and a first receiving unit, configured to receive a PDN address capability determined by the network according to the IP address acquisition request or the PDN address allocation information.

In still another aspect, the present disclosure further provides network equipment, which includes a fourth receiving unit, configured to receive an IP address acquisition request or PDN address allocation information sent by a UE; and a fourth sending unit, configured to determine a PDN address capability according to the IP address acquisition request or the PDN address allocation information, and send the determined PDN address capability to the UE.

BRIEF DESCRIPTION OF THE DRAWINGS

To illustrate the technical solutions, which are specified in the embodiments of the present disclosure or in the prior art more clearly, the accompanying drawings for describing the embodiments or the existing technology are introduced briefly in the following. Apparently, the accompanying drawings in the following description are only some embodiments of the present disclosure; persons of ordinary skill in the art can deduce other drawings according to the accompanying drawings without paying any creative efforts.

DETAILED DESCRIPTION OF THE EMBODIMENTS

The present disclosure relates to the field of communications, and more particularly to a method for acquiring information, User Equipment (UE), and network equipment. In the present disclosure, the PDN address capability is determined by the network and is sent to the UE, so as to inform the UE about the IP address information which can be used for acquiring IP address by the UE for the current PDN connection, so that it will avoid service abnormality due to the UE acquiring new IP address in other manner if the network is unable to provide other IP address to the UE for the PDN connection.

Figure 1:
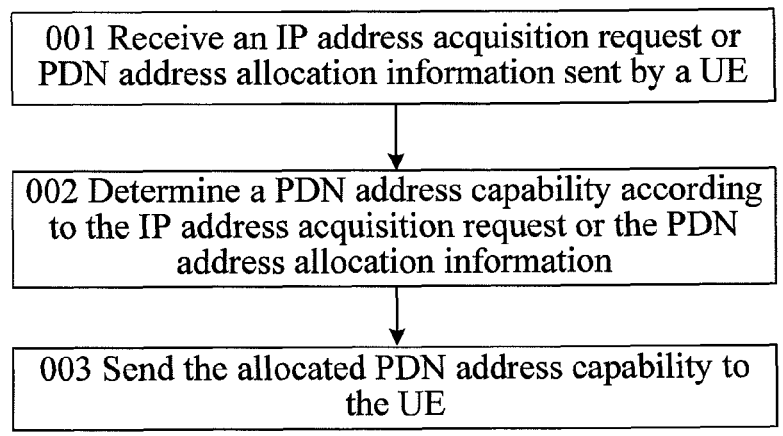
FIG. 1 is a schematic view of a method for acquiring information according to a first embodiment of the present disclosure.

Referring to FIG. 1, a method for acquiring information according to a first embodiment of the present disclosure includes the following steps.

In Step 001, an IP address acquisition request or PDN address allocation information sent by a UE is received.

In Step 002, a PDN address capability is determined according to the IP address acquisition request or the PDN address allocation information.

In Step 003, the allocated PDN address capability is sent to the UE.

Figure 2:
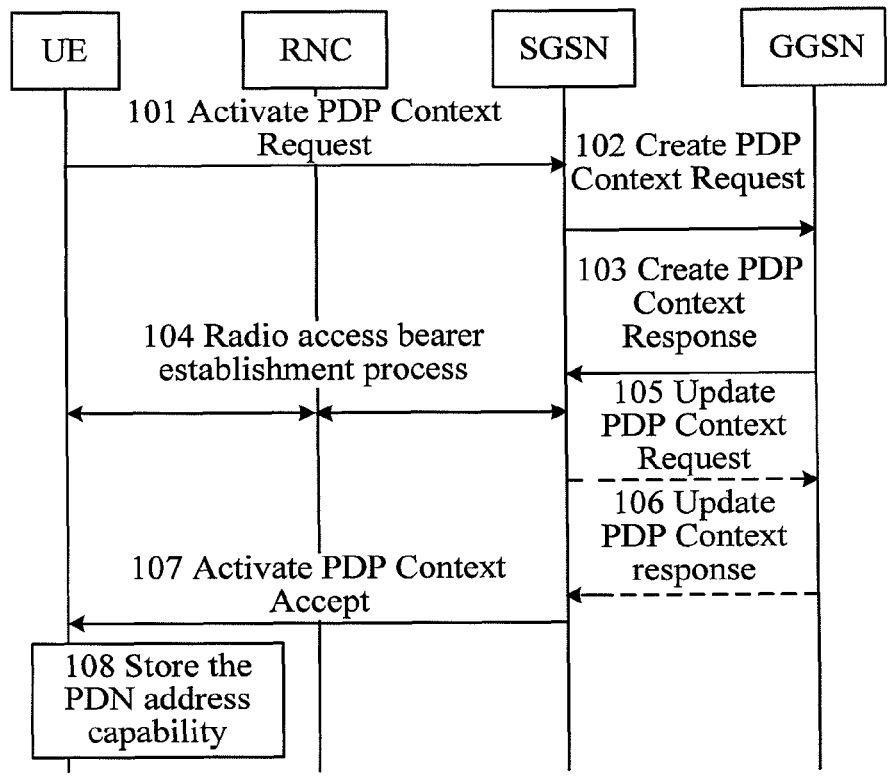
FIG. 2 is a schematic view of a method for acquiring information by a UE in a Release-8 GPRS/UMTS system according to a second embodiment of the present disclosure.

Referring to FIG. 2, in a second embodiment, the present disclosure provides a method for acquiring information by a UE in a Release-8 GPRS/UMTS system, which includes the following steps.

In Step 101, the UE sends an Activate PDP Context Request message to a Serving GPRS Support Node (SGSN), so as to request to establish a first bearer of a PDN connection. The Activate PDP Context Request message may include one or more of the following information, IP version capability supported by the UE, Access Point Name (APN) corresponding to the PDN connection, and the requested IP address version (IPv4 or IPv6).

In Step 102, the SGSN establishes a bearer context, selects a Gateway GPRS Support Node (GGSN) for the UE, and sends a Create PDP Context Request message to the GGSN through a Gn/Gp interface between the SGSN and the GGSN.

In Step 103, the GGSN establishes a bearer context, and sends a Create PDP Context Response message to the SGSN.

In the Step 103, if the GGSN receives a static IP address subscribed for the UE provided by the SGSN in Step 102, or the GGSN allocates a dynamic IP address for the UE according to the configured IP address version for the APN, the GGSN includes the IP address, or the IP address and the IP address version in the Create PDP Context Response message and sends the response message to the SGSN. According to an operator policy, an all zero IP address (for example, 0.0.0.0) may be included in the Create PDP Context Response message, so as to instruct the UE to subsequently acquire an IP address for the PDN connection in an Internet Engineering Task Force (IETF) manner (for example, a Dynamic Host Configuration Protocol (DHCP)).

In Step 104, the SGSN establishes a radio access bearer corresponding to the PDP context with a Radio Network Controller (RNC) and the UE.

In Step 105, if the Quality of Service (QoS) for the PDP context is changed in Step 104, the SGSN includes the updated QoS in the Update PDP Context Request message, and sends the request message to the GGSN.

In Step 106, the GGSN updates the QoS, and returns an Update PDP Context Response message to the SGSN.

In Step 107, the SGSN sends an Activate PDP Context Accept message to the UE, in which the message includes the IP address information provided by the GGSN for the UE, which may be all zero. The message may further include "PDN address capability" information, and IP address version (IPv4, IPv6, or IPv4/IPv6) and/or the IP address quantity (1 or 2) which are allowed by the network for the UE to acquire for the PDN connection, and the UE may determine new IP address version (none, IPv4, IPv6, or IPv4/IPv6) and/or the IP address quantity (0, 1, or 2) that may be subsequently applied for by the UE for the PDN connection according to the already acquired IP address quantity and/or version information. The "PDN address capability" information may also directly indicate the new IP address version (none, IPv4, IPv6, or IPv4/IPv6) and/or the IP address quantity (0, 1, or 2) that may be subsequently applied for by the UE for the PDN connection.

In Step 107, the "PDN address capability" information provided by the SGSN for the UE may be directly determined by the SGSN. A typical decision method may be drawn according to one or more of the following three factors: 1) the IP address version information of the PDP context corresponding to the APN subscribed for the UE; 2) the version of GGSN selected by the SGSN (for example, a pre-Release-8 GGSN only supports allocation of only one IP address for the UE per one PDN connection); and 3) the IP address information allocated by the GGSN for the UE during the PDP Context Activation procedure. For example, if the PDP version of the APN supports IPv4 and IPv6, but the SGSN selects a pre-R8 GGSN, and the GGSN allocates an IPv4 address for the UE, the "PDN address capability" may be the IP address version available for the UE, i.e. IPv4 and/or IP address quantity available for the UE, i.e. 1, or IP address version available for the UE for further acquisition, i.e. none and/or IP address quantity available for the UE for further acquisition, i.e. 0, and may also include relevant reasons, for example, equipment capability limitation (the pre-Release-8 GGSN can only allocate one IP address).

In this embodiment, the "PDN address capability" information may also be determined and provided by the GGSN, sent to the SGSN through the Create PDP Context Response message in Step 103, and then sent to the UE by the SGSN through the Activate PDP Context Accept message in Step 107. A typical determining method by the GGSN may be drawn according to the following three factors: 1) the IP address version information of the PDP context corresponding to the APN of the UE configured in the GGSN; 2) the version capability of the GGSN selected by the SGSN (for example, an Release-8 GGSN supports allocation of two IP addresses for the UE per one PDN connection); 3) the IP address information allocated by the GGSN for the UE during the PDP Context Activation procedure. For example, if the PDP version of the APN supports IPv4 and IPv6, and the Release-8 GGSN is selected, but the GGSN allocates an IPv4 address for the UE, the "PDN address capability" may be the IP address version available for the UE, i.e. IPv4/IPv6 and/or IP address quantity available for the UE, i.e. 2 or IP address version available for the UE for further acquisition, i.e. IPv6 and/or IP address quantity available for the UE for further acquisition, i.e. 1 and may also include relevant reasons, for example, network preferences (although the network supports allocation of two IP addresses, currently only one address is allocated).

When the GGSN instructs the UE to subsequently acquire the IP address for the PDN connection in an IETF manner (for example, DHCP), the "PDN address capability" is also applicable. At this time, when the network supports dual stacks (for example, the GGSN is the R8 GGSN), the "PDN address capability" may be the IP address version=IPv4/IPv6 and/or IP address quantity=2 available for the UE, or IP address version=IPv4/IPv6 and/or IP address quantity=2 that may be further acquired by the UE, and may also include relevant reasons, for example, network capabilities (both the user subscription data and the network equipment support allocation of two IP addresses).

In Step 108, after receiving the Activate PDP Context Accept message, the UE stores the "PDN address capability" information, and checks whether the network can allocate more IP address for the UE according to the PDN address capability. The specific determining method varies with different forms of the "PDN address capability" stored by the UE: when the PDN address capability stored by the UE represents the IP address version and/or the IP address quantity available for the UE in the PDN connection, the UE needs to subtract the IP address version and/or the IP address quantity already acquired by the UE according to the PDN address capability, and if the IP address version information is not none or the IP address quantity is not 0 after subtraction, the network can allocate more IP address for the UE; and when the PDN address capability stored by the UE represents the IP address version and/or the IP address quantity that may be subsequently acquired by the UE in the PDN connection, if the address version information is not none or the address quantity is not 0, the UE may directly determine whether the network can allocate more IP address for the UE according to the information, and at this time, after acquiring a new IP address, the UE needs to update the stored PDN address capability. The relevant reason instruction provided by the network may also assist the UE to understand whether the network can allocate the IP address for the UE. When the UE can still acquire an IP address for the PDN connection, if the UE needs to use a new IP address, for example, with another IP version for specific service, the UE acquires the IP address with the required version for the PDN connection. Particularly, the UE may acquire the IP address by performing an IETF signaling procedure for special IP address version according to the instruction, for example, if the network allows to acquire an IPv4 address, the UE may initiate a DHCPv4 procedure to acquire the IPv4 address; if the network allows to acquire an IPv6 address, the UE may initiate a DHCPv6 procedure to acquire the IPv6 address; and if the network allows to acquire both the IPv4 address and the IPv6 address, the UE may respectively initiate the DHCPv4 procedure and the DHCPv6 procedure to acquire the IPv4 address and the IPv6 address. The specific method for acquiring the IP address is described in other embodiments of the present disclosure, so that the details will not be described here again. If the UE determines that the address version information that may be subsequently acquired by the UE is none, or the address quantity is 0 according to the PDN address capability, it represents that the network cannot continue providing the IP address for the UE, and the UE does not initiate any IP address acquisition procedure subsequently.

Through the embodiment of the present disclosure, when the UE supporting dual stacks (IP addresses of two different versions may be acquired in one PDN connection) accesses a pre-R8 GGSN or an R8 GGSN through an R8 SGSN, the network instructs to the UE the IP address information that may be acquired in the current PDN connection, such that when the network cannot provide an IP address for the UE any more, the UE is prevented from acquiring other IP addresses in other manners to result in service abnormality.

The embodiment is applied to the R8 GRPS/UMTS system, and after establishing a first bearer of a certain PDN connection, the UE may determine whether the network can continue providing the IP address for the UE according to the "PDN address capability" information provided for the UE in Step 107 of the second embodiment, so as to initiate the relevant procedure to acquire the IP address with specific version when requiring to use a new IP address. If the UE determines that the address version information that may be subsequently acquired by the UE is not none, or the address quantity is not 0 according to the PDN address capability, it represents that the network can allocate more IP address for the UE.

The following third and fourth embodiments provide a method for acquiring information from a network by a UE in cases of modifying a PDP context and activating a secondary PDP context.

Figure 3:
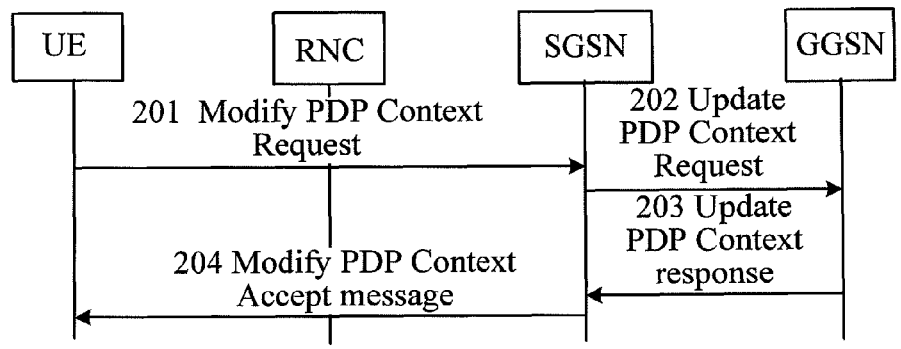
FIG. 3 is a schematic view of a method for acquiring information by a UE through a bearer modification procedure in a Release-8 GPRS/UMTS system according to a third embodiment of the present disclosure.

Referring to FIG. 3, in the third embodiment, the present disclosure provides a method for acquiring information by a UE through a bearer modification process in an R8 GPRS/UMTS system.

In Step 200, the UE determines whether the network can continue providing an IP address for the UE according to a PDN address capability. A specific determining step is the same as Step 108, and if a new IP address may be acquired, Step 201 is executed; otherwise, the process is ended.

The PDN address capability may be acquired during a procedure in which the UE acquires the IP address from the network for the first time, for example, through the solution provided in the second embodiment, or may be PDN address capability locally configured in the UE to represent IP address version and/or IP address quantity available for the UE in a PDN connection.

In Step 201, the UE sends a Modify PDP Context Request message to an SGSN, in which the message may include IP address version information (IPv4, IPv6, or IPv4/IPv6) requested by the UE. The UE selects any bearer in the PDN connection to initiate a modification process, and usually selects the first bearer of the PDN connection.

In Step 202, the SGSN sends an Update PDP Context Request message to a GGSN, in which the message may include the IP address version requested by the UE.

In Step 203, the GGSN allocates an IP address of the corresponding version for the UE according to the IP address version requested by the UE, and includes the IP address in an Update PDP Context Response message and sends the response message to the SGSN. According to an operator policy, the GGSN may also instruct the UE to acquire the IP address of the corresponding version in an IETF manner (for example, DHCP) after the bearer modification process, the instruction may be implemented by providing an all zero IP address by the GGSN, or may be implemented by providing an "IETF address allocation" instruction, and the instruction may be included in the Update PDP Context Response message and sent to the SGSN.

In Step 204, the SGSN sends a Modify PDP Context Accept message to the UE, in which the message includes the IP address or information instructing the UE to acquire the IP address in the IETF manner allocated by the GGSN for the UE. The UE stores the IP address allocated by the GGSN, or initiates an IETF procedure to acquire the IP address according to the IETF manner provided by the GGSN.

In Step 204, after the UE acquires the IP address or acquires the IP address in the subsequent IETF manner, if the stored "PDN address capability" is the IP address version and/or the IP address quantity that may be further acquired by the UE, the "PDN address capability" information stored in the UE needs to be updated. For example, the UE has previously acquired an IPv4 address during the PDP activation procedure, the stored "PDN address capability" is the IP address version=IPv6 and/or the IP address quantity=1 that may be further acquired by the UE, and when the UE acquires an IPv6 address in Step 204 or the subsequent IETF process through the method of the second embodiment, the UE needs to update the stored "PDN address capability" to be the IP address version=none and/or the IP address quantity=0 that may be further acquired by the UE.

When the stored "PDN address capability" is IP address version and/or IP address quantity available for the UE, the update procedure does not need to be performed, and the UE may determine the IP address version and/or the IP address quantity that may be further acquired by the UE according to the "PDN address capability" information and the already acquired IP address information.

Figure 4:
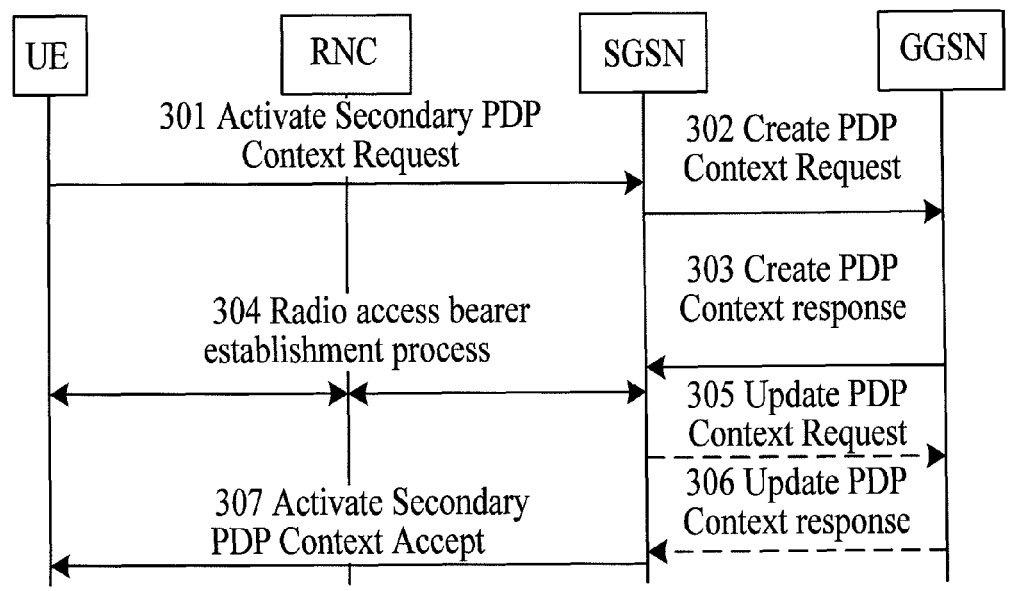
FIG. 4 is a schematic view of a method for acquiring information by a UE through a secondary activation procedure in a Release-8 GPRS/UMTS system according to a fourth embodiment of the present disclosure.

Referring to FIG. 4, in the fourth embodiment, the present disclosure provides a method for acquiring information by a UE through a Secondary PDP Context Activation procedure in an R8 GPRS/UMTS system.

In Step 300, the UE determines whether the network can continue providing an IP address for the UE according to a "PDN address capability". A specific determining step is the same as Step 108, and if a new IP address may be acquired, Step 301 is executed; otherwise, the process is ended.

In Step 301, the UE sends an Activate Secondary PDP Context Request message to a SGSN, in which the message may include an IP address version (IPv4, IPv6, or IPv4/IPv6) requested by the UE, so as to instruct the network to allocate the IP address of the corresponding version for the UE.

In Step 302, the SGSN sends a Create PDP Context Request message to a GGSN, in which message may include the IP address version requested by the UE.

In Step 303, the GGSN establishes a PDP context, allocates an IP address of the version corresponding to a PDN connection for the UE according to the IP address version requested by the UE, and includes the IP address in a Create PDP Context Response message and sends the response message to the SGSN. According to an operator policy, the GGSN may also instruct the UE to acquire the IP address of the corresponding version in an IETF manner (for example, DHCP) after the secondary PDP activation procedure, the instruction may be implemented by providing an all zero IP address by the GGSN for the UE, or may be implemented by providing an "IETF address allocation" instruction for the UE, and the instruction may be included in the Create PDP Context Response message, and the response message is sent to the SGSN.

In Step 304, the SGSN establishes a radio access bearer corresponding to the PDP context with an RNC and the UE.

In Step 305, if in Step 304, a QoS is changed, the SGSN includes the updated QoS in an Update PDP Context Request message and sends the request message to the GGSN.

In Step 306, the GGSN sends an Update PDP Context Response message to the SGSN.

In Step 307, the SGSN sends an Activate Secondary PDP Context Accept message to the UE, in which the message includes the IP address and/or information of instructing the UE to acquire the IP address in the IETF manner allocated by the GGSN for the UE. The UE stores the IP address allocated by the GGSN, or initiates an IETF process to acquire the IP address according to the IETF allocation manner provided by the GGSN.

In Step 307, after the UE acquires the IP address or acquires the IP address in the subsequent IETF manner, if the stored "PDN address capability" is the IP address version and/or the IP address quantity that may be further acquired by the UE, the "PDN address capability" information stored in the UE needs to be updated. A processing manner is similar to that of the second embodiment, so that the details will not be described here again.

When the UE accesses an EPS network, during a bearer setup procedure for a PDN connection, IP addresses of the UE of two different versions may be allocated for the PDN connection of the UE, or only one IP address or no IP address is allocated for the UE according to the capability of the UE and the operator policy. Therefore, during the establishment procedure of a default bearer (that is, a first bearer), "PDN address capability" information needs to be provided by the network for the UE, so as to indicate to the UE whether a new IP address can be subsequently applied for in the PDN connection.

Figure 5:
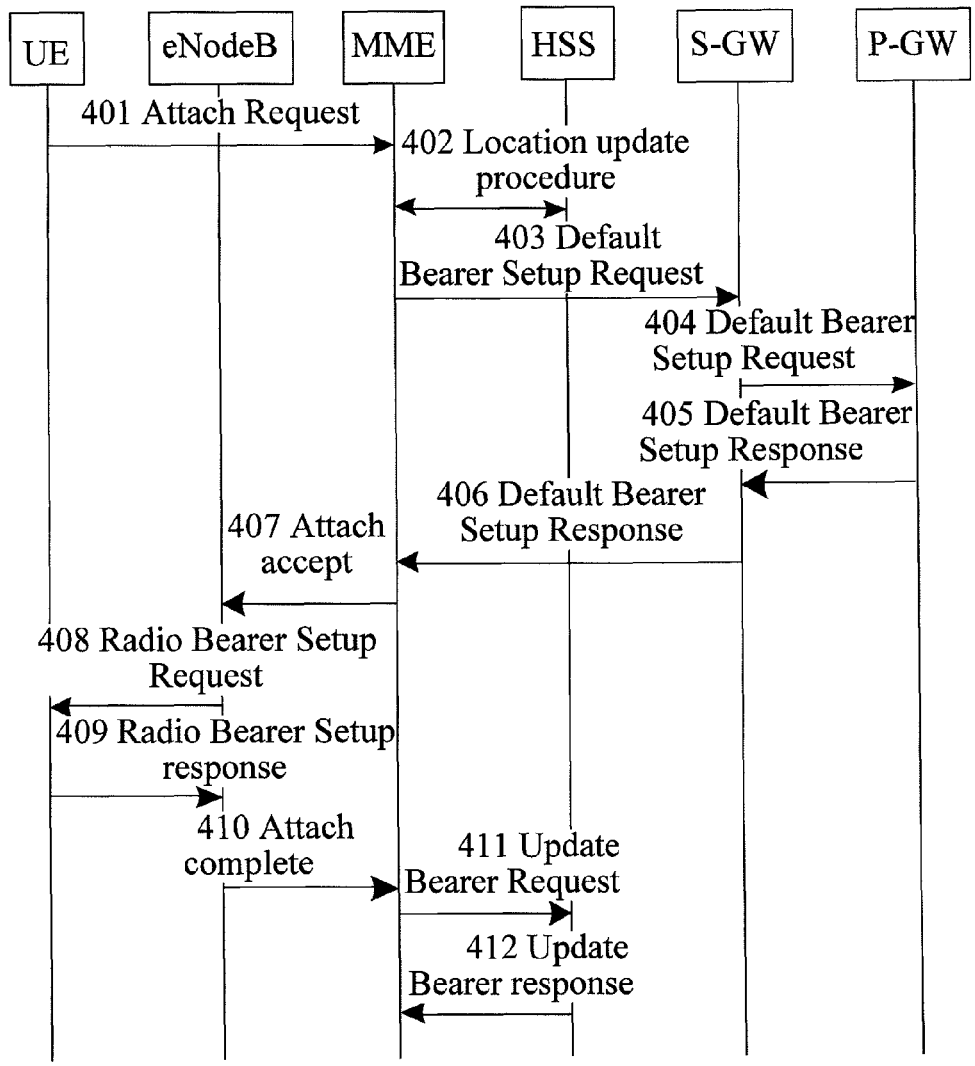
FIG. 5 is a schematic view of a method for acquiring information by a UE through an attachment procedure in an EPS network according to a fifth embodiment of the present disclosure.

Referring to FIG. 5, in a fifth embodiment, the present disclosure provides a method for acquiring information from a network by a UE during the attach procedure in an EPS network.

In Step 401, the UE sends an Attach Request message to a Mobility Management Entity (MME), in which the message carries PDN address allocation information, and the PDN address allocation information includes IP version capability information supported by the UE and an instruction whether an address is required to be allocated for the UE during the procedure.

In Step 402, a location update procedure is executed between the MME and a Home Subscriber Server (HSS), subscription data of the user is acquired, and the MME is registered to the HSS, in which the subscription data may include a default APN of the UE, and IP address version information for the bearer.

In Step 403, during the attach procedure, according to the default APN subscribed for the UE, a default bearer is established for the UE, and the MME sends a Default Bearer Setup Request message to a Serving Gateway (S-GW), in which the message includes the supported IP version capability information provided by the UE, and the APN.

In Step 404, the S-GW sends a Default Bearer Setup Request message to a Packet Data Network Gateway (P-GW), in which the message includes the supported IP version capability information provided by the UE, and the APN.

In Step 405, the P-GW establishes a context for the default bearer, and sends a Default Bearer Setup Response message to the S-GW. When the PDN address allocation information provided by the UE instructs that an address is required to be allocated for the UE in the procedure, an IP address is allocated for the UE according to the IP version capability supported by the UE and an operator policy, and the IP address is included in the message and the response message is sent to the S-GW. When the PDN address allocation information provided by the UE instructs that no address is required to be allocated for the UE in the process, no IP address needs to be allocated for the UE in this step.

The message may further include "PDN address capability" information. The information may be used for providing IP address version (IPv4, IPv6, or IPv4/IPv6) and/or IP address quantity (1 or 2) available for the UE in the PDN connection allowed by the network for the UE, and the UE may determine IP address version and/or quantity that may be subsequently acquired by the UE in the PDN connection according to the already acquired IP address quantity and/or version information. The information may also be used for instructing new IP address version (none, IPv4, IPv6, or IPv4/IPv6) and/or quantity (0, 1, or 2) that may be subsequently applied for by the UE in the PDN connection.

The PDN address capability is determined according to the UE capability and the network capability, and a typical method for determining the "PDN address capability" information by the P-GW may be obtained according to one or two of the following two factors: 1) the address version information of the bearer or the IP connection corresponding to the APN of the UE configured in the P-GW; and 2) the IP address information allocated by the P-GW for the UE during the bearer activation procedure. For example, if the address version information of the bearer or the IP connection of the APN supports IPv4 and IPv6, but the P-GW allocates an IPv4 address for the UE, the "PDN address capability" may be the IP address version=IPv4/IPv6 and/or IP address quantity=2 available for the UE, or IP address version=IPv6 and/or IP address quantity=1 that may be further acquired by the UE, and may also include relevant reasons, for example, network preferences (e.g. although the network supports allocation of two IP addresses, currently only one address is allocated).

Similar to the first embodiment, the "PDN address capability" provided for the UE may be directly determined by the MME according to 1) the address version information of the EPS bearer corresponding to the APN subscribed by the UE; and 2) the IP address information allocated by the P-GW for the UE during the default Bearer Setup procedure. Since the P-GW always supports the function of allocating IP addresses of two versions, the version of the P-GW does not need to be determined. The relevant processing is the same as that of Step 107, so that the details will not be described here again.

In Step 406, the S-GW sends a Default Bearer Setup Response message to the MME, in which the message includes the IP address of the UE and the "PDN address capability" information provided by the P-GW.

In Step 407, the MME sends an Attach Accept message to an evolved base station (eNodeB), and sends the IP address of the UE provided by the P-GW to the eNodeB. The message may further include the "PDN address capability" information provided by the P-GW.

In Step 408, the eNodeB sends a Radio Bearer Setup Request message to the UE, and sends the IP address of the UE provided by the P-GW to the UE. The message may further include the "PDN address capability" information provided by the P-GW.

After receiving the Radio Bearer Setup Request (including an Attach Accept content) message, the UE stores the "PDN address capability" information, and determines whether the network can continue providing the IP address for the UE according to the PDN address capability. A specific determining method is the same as that of Step 108, so that the details will not be described here again.

In Step 409, the UE sends a Radio Bearer Setup Response message to the eNodeB.

In Step 410, the eNodeB sends an Attach Complete message to the MME, in which the message includes downlink routing information provided by the eNodeB.

In Step 411, the MME sends an Update Bearer Request to the S-GW, and updates the downlink routing information provided by the eNodeB to the S-GW.

In Step 412, the S-GW sends an Update Bearer Response message to the MME.

Figure 6:
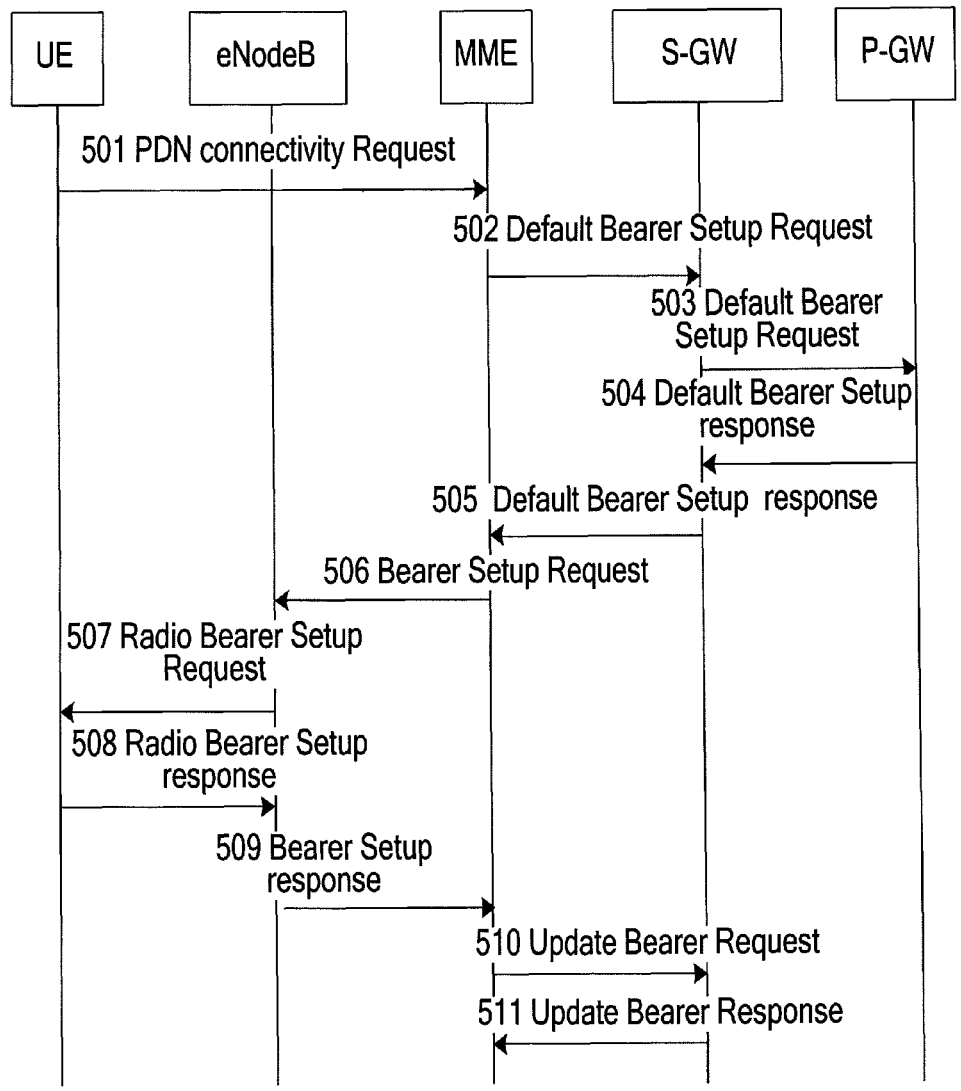
FIG. 6 is a schematic view of a method for acquiring information by a UE through an UE initiated PDN connection procedure in an EPS network according to a sixth embodiment of the present disclosure.

Referring to FIG. 6, in a sixth embodiment, the present disclosure provides a method for acquiring information by a UE through an UE requested PDN connectivity procedure in an EPS network In Step 501, the UE initiates a PDN connectivity Request message to a MME, so as to request to establish a default bearer of a PDN connection. The message may include PDN address allocation information, including IP version capability information supported by the UE and an instruction whether an address is required to be allocated for the UE during the procedure, and may further include an APN.

In Step 502, the MME sends a Default Bearer Setup Request message to an S-GW, in which the message includes the supported IP version capability information provided by the UE, and the APN.

In Step 503, the S-GW sends a default Bearer Setup request message to a P-GW, in which the message includes the supported IP version capability information provided by the UE, and the APN.

In Step 504, the P-GW establishes a default bearer context of the PDN connection for the UE, and sends a default Bearer Setup response message to the S-GW. When the PDN address allocation information provided by the UE instructs that an address is required to be allocated for the UE during the procedure, an IP address is allocated for the UE according to the IP version capability supported by the UE and an operator policy, and the IP address is included in the default Bearer Setup response message and the response message is sent to the S-GW. When the PDN address allocation information provided by the UE instructs that no address is required to be allocated for the UE in the process, no IP address needs to be allocated for the UE in the step.

The message may further include "PDN address capability" information. The information may be used for providing IP address version (IPv4, IPv6, or IPv4/IPv6) and/or IP address quantity (1 or 2) available for the UE in the PDN connection allowed by the network for the UE, and the UE may determine IP address version and/or quantity that may be subsequently acquired by the UE for the PDN connection according to the already acquired IP address quantity and/or version information. The information may also be used for instructing new IP address version (none, IPv4, IPv6, or IPv4/IPv6) and/or quantity (0, 1, or 2) that may be subsequently applied for by the UE for the PDN connection.

The PDN address capability is determined according to the UE capability and the network capability. The method for determining the "PDN address capability" information by the P-GW is similar to the determining method in the fifth embodiment, so that the details will not be described here again.

In Step 505, the S-GW sends a default Bearer Setup response message to the MME, in which the message includes the IP address of the UE and the "PDN address capability" information provided by the P-GW.

In Step 506, the MME sends a Bearer Setup Request message to an eNodeB, and sends the IP address of the UE provided by the P-GW to the eNodeB. The message may further include the "PDN address capability" information provided by the P-GW.

In Step 507, the eNodeB sends a radio Bearer Setup request message to the UE, and sends the IP address of the UE provided by the P-GW to the UE. The message may further include the "PDN address capability" information provided by the P-GW.

After receiving the radio Bearer Setup request message, the UE stores the "PDN address capability" information, and determines whether the network can continue providing the IP address for the UE according to the PDN address capability. A specific determining method is the same as that of Step 108, so that the details will not be described here again.

In Step 508, the UE sends a radio Bearer Setup response message to the eNodeB.

In Step 509, the eNodeB sends a Bearer Setup Response message to the MME, in which the message includes downlink routing information provided by the eNodeB.

In Step 510, the MME sends an Update Bearer Request to the S-GW, and updates the downlink routing information provided by the eNodeB to the S-GW.

In Step 511, the S-GW sends a Update Bearer Response message to the MME.

In the fifth embodiment and the sixth embodiment, the present disclosure provides a method for acquiring information by a UE in an EPS network. In the embodiments, during the default Bearer Setup procedure, the network provides "PDN address capability" information for the UE, so as to indicate to the UE whether another IP addresses can be acquired in the PDN connection, such that when the network does not allow the UE to acquire more than one IP address, the UE is prevented from initiating an IP address acquisition process to result in resource waste.

The fifth embodiment and the sixth embodiment are applied to the EPS network, and after the UE establishes the default bearer of a specific PDN connection, the UE may initiate the relevant process of acquiring the IP address of the corresponding version when requiring to acquire a new IP address, according to the "PDN address capability" information provided for the UE in the embodiments. The following seventh and eighth embodiments provide a method for acquiring an IP address from a network by a UE after a default bearer of a PDN connection is established.

Figure 7:
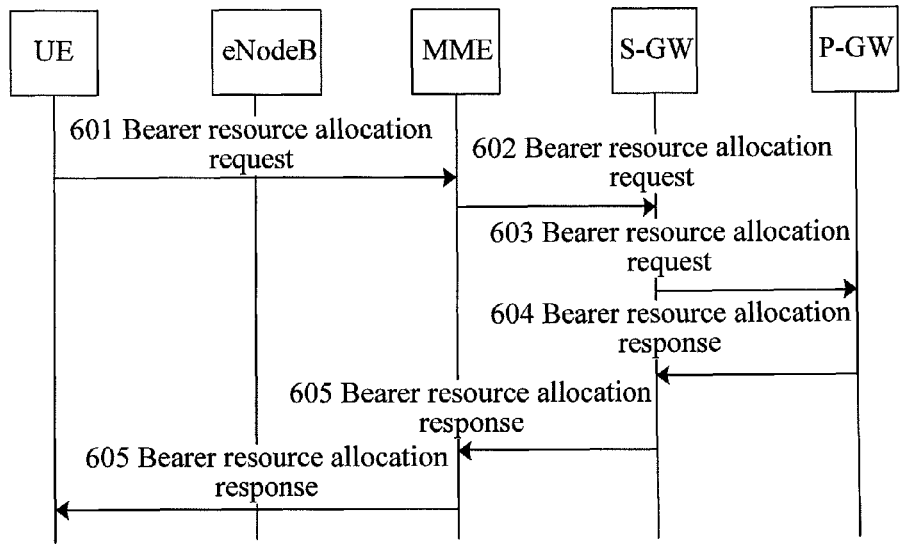
FIG. 7 is a schematic view of a method for acquiring information by a UE through a bearer resource allocation message in an EPS network according to a seventh embodiment of the present disclosure.

Referring to FIG. 7, in the seventh embodiment, the present disclosure provides a method for acquiring information by a UE through a bearer resource allocation message in an EPS network.

In Step 600, the UE determines whether the network can continue providing an IP address for the UE according to a PDN address capability. A specific determining step is the same as Step 108, and if a new IP address may be acquired, Step 601 is executed; otherwise, the process is ended.

In Step 601, the UE sends a bearer resource allocation request message to a MME. The message includes a linked bearer ID, in which the ID may be an ID of any bearer in the PDN connection, and usually is the default bearer ID of the PDN connection. The message may further include an IP address version (IPv4, IPv6, or IPv4/IPv6) requested by the UE, so as to instruct the network to allocate the IP address of the corresponding version for the UE.

In Step 602, the MME sends a bearer resource allocation request message to an S-GW, in which the message may include the IP address version requested by the UE.

In Step 603, the S-GW sends a bearer resource allocation request message to a P-GW, in which the message may include the IP address version requested by the UE.

In Step 604, the P-GW allocates an IP address of the corresponding version for the UE according to the IP address version requested by the UE, and includes the IP address in a bearer resource allocation response message and sends the response message to the S-GW. According to an operator policy, the P-GW may instruct the UE to acquire the IP address of the corresponding version in an IETF manner (for example, DHCP) after the resource allocation request procedure, the instruction may be implemented by providing an all zero IP address by the P-GW, or may be implemented by providing an "IETF address allocation" instruction, and the instruction may included in the bearer resource allocation response message and sent to the S-GW.

In Step 605, the S-GW includes the IP address or the instruction of acquiring the IP address in the IETF manner allocated by the P-GW in a bearer resource allocation response message and sends the response message to the MME.

In Step 606, the MME includes the IP address or the instruction of acquiring the IP address in the IETF manner allocated by the P-GW in a bearer resource allocation response message and sends the response message to the UE.

The UE stores the IP address allocated by the P-GW, or initiates an IETF process to acquire the IP address according to the IETF allocation manner provided by the P-GW.

In Step 606, after the UE acquires the IP address or acquires the IP address in the subsequent IETF manner, if the stored "PDN address capability" is the IP address version and/or the IP address quantity that may be further acquired by the UE, the "PDN address capability" information recorded in the UE needs to be updated. A processing manner is similar to that of the third embodiment, so that the details will not be described here again.

Figure 8:
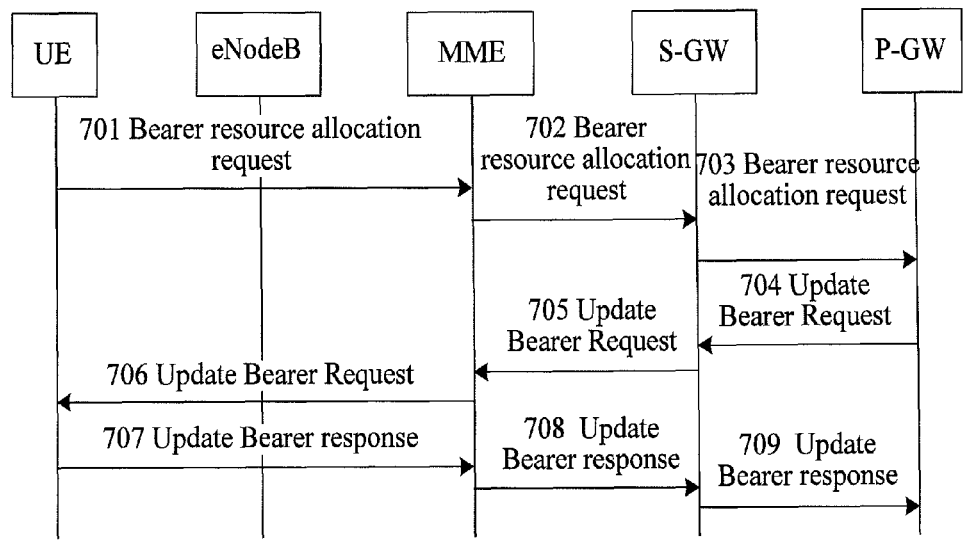
FIG. 8 is a schematic view of a method for acquiring information by a UE through a bearer update procedure in an EPS network according to an eighth embodiment of the present disclosure.

When the P-GW receives the bearer resource allocation request message sent by the S-GW, the P-GW may notify the UE of the IP address of the UE through a bearer update procedure. Referring to FIG. 8, in the eighth embodiment, the present disclosure provides a method for acquiring information by a UE through a bearer update procedure in an EPS network.

In Step 700, the UE determines whether the network can continue providing an IP address for the UE according to a PDN address capability. A specific determining step is the same as Step 108, and if a new IP address may be acquired, Step 701 is executed; otherwise, the process is ended.

In Step 701, the UE sends a bearer resource allocation request message to an MME. The message includes a linked bearer ID, in which the ID may be an ID of any bearer in the PDN connection, and usually is the default bearer ID of the PDN connection. The message may further include an IP address version (IPv4, IPv6, or IPv4/IPv6) requested by the UE, so as to instruct the network to allocate the IP address of the corresponding version for the UE.

In Step 702, the MME sends a bearer resource allocation request message to an S-GW, in which the message may include the IP address version requested by the UE.

In Step 703, the S-GW sends a bearer resource allocation request message to a P-GW, in which the message may include the IP address version requested by the UE.

In Step 704, the P-GW allocates an IP address of the corresponding version for the UE according to the IP address version requested by the UE, and includes the IP address in an Update Bearer Request message and sends the request message to the S-GW. According to an operator policy, the P-GW may instruct the UE to acquire the IP address of the corresponding version in an IETF manner (for example, DHCP) after the resource allocation request process, the instruction may be implemented by providing an all zero IP address by the P-GW, or may be implemented by providing an "IETF address allocation" instruction, and the instruction may be included in the Update Bearer Request message and the request message is sent to the S-GW.

In Step 705, the S-GW includes the IP address or the instruction of acquiring the IP address in the IETF manner allocated by the P-GW in an Update Bearer Request message sends the request message to the MME.

In Step 706, the MME includes the IP address or the instruction of acquiring the IP address in the IETF manner allocated by the P-GW in a bearer update request message and sends the request message to the UE. The UE stores the IP address allocated by the P-GW, or initiates an IETF process to acquire the IP address according to the IETF allocation manner provided by the P-GW.

In Step 706, after the UE acquires the IP address or acquires the IP address in the subsequent IETF manner (the process may be executed after Step 709), if the stored "PDN address capability" is the IP address version and/or the IP address quantity that may be further acquired by the UE, the "PDN address capability" information stored in the UE needs to be updated. A processing manner is similar to that of the third embodiment, so that the details will not be described here again.

In Step 707, the UE sends a bearer update response message to the MME.

In Step 708, the MME sends an Update Bearer Response message to the S-GW.

In Step 709, the S-GW sends an Update Bearer Response message to the P-GW.

Figure 9:
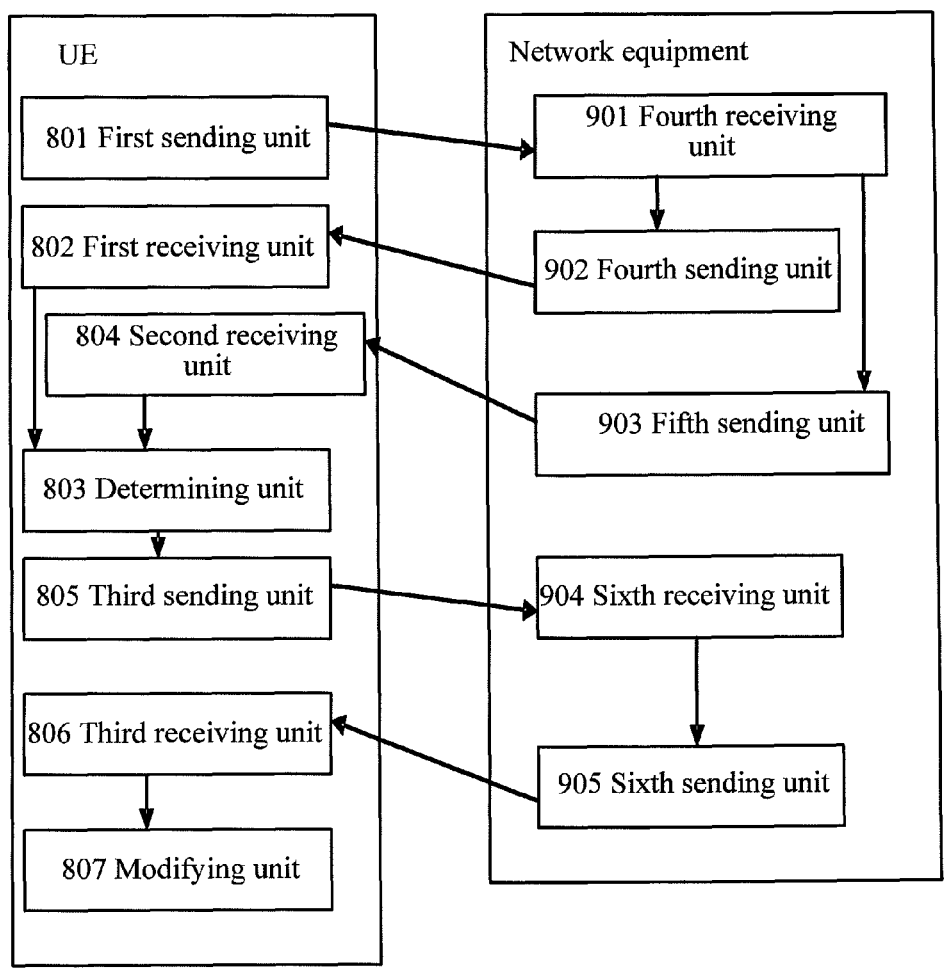
FIG. 9 is a schematic view of a UE according to a ninth embodiment of the present disclosure and network equipment according to a tenth embodiment of the present disclosure.

Referring to FIG. 9, in a ninth embodiment, the present disclosure provides a UE 800, which includes a first sending unit 801 and a first receiving unit 802.

The first sending unit 801 is configured to send an IP address acquisition request or PDN address allocation information to a network. The first receiving unit 802 is configured to receive a PDN address capability allocated by the network according to the IP address acquisition request or the PDN address allocation information.

If the PDN address allocation information includes an instruction that an IP address is required to be allocated for the UE or the first sending unit sends the IP address acquisition request to the network, the UE further includes a second receiving unit 804, configured to receive the allocated IP address or an instruction of a manner of acquiring the IP address sent by the network.

The UE further includes a determining unit 803, configured to determine whether a request of acquiring an IP address in a PDN connection may be initiated according to the PDN address capability.

When the determining unit 803 determines that the IP address in the PDN may be acquired, the UE further includes a third sending unit 805, configured to send an IP address request message to the network; and a third receiving unit 806, configured to receive the IP address or the instruction of the manner of acquiring the IP address allocated by the network.

The PDN address capability includes all IP address versions and/or total IP address quantity available for the UE in the PDN connection allowed by the network; or remaining IP address versions and/or remaining IP address quantity available for the UE in the PDN connection allowed by the network. When the PDN address capability includes the remaining IP address versions and/or remaining IP address quantity available for the UE in the PDN connection allowed by the network, the UE further includes a modifying unit 807, configured to modify the PDN address capability according to the received IP address allocated by the network.

In one case, the third sending unit 805 includes a PDP context modification request sending unit, configured to send a Modify PDP Context Request message to the network, in which the Modify PDP context Request message includes requested IP address version information; and the third receiving unit 806 includes a PDP context modification accept receiving unit, configured to receive a Modify PDP Context Accept message sent by the network, in which the message includes the IP address or the instruction of the manner of acquiring the IP address allocated by the network.

In another case, the third sending unit 805 includes a secondary PDP context activation request sending unit, configured to send an Activate Secondary PDP Context Request message to the network, in which the Activate Secondary PDP Context Request message includes the requested IP address version information; and the third receiving unit 806 includes a secondary PDP context activation accept receiving unit, configured to receive a Activate Secondary PDP Context Accept message sent by the network, in which the Activate Secondary PDP Context Accept message includes the IP address or the instruction of the manner of acquiring the IP address allocated by the network.

In still another case, the third sending unit 805 includes a first bearer resource allocation request sending unit, configured to send a bearer resource allocation request message to the network, in which the bearer resource allocation request message includes the requested IP address version information; and the third receiving unit 806 includes a bearer resource allocation response receiving unit, configured to receive a bearer resource allocation response message sent by the network, in which the bearer resource allocation response message includes the IP address or the instruction of the manner of acquiring the IP address allocated by the network.

In yet still another case, the third sending unit 805 includes a second bearer resource allocation request sending unit, configured to send a bearer resource allocation request message to the network, in which the bearer resource allocation request message includes the requested IP address version information; and the third receiving unit 806 includes a bearer update request receiving unit, configured to receive a bearer update request message sent by the network, in which the bearer update request message includes the IP address or the instruction of the manner of acquiring the IP address allocated by the network.

Referring to FIG. 9, in a tenth embodiment, the present disclosure provides network equipment, which includes a fourth receiving unit 901 and a fourth sending unit 902.

The fourth receiving unit 901 is configured to receive an IP address acquisition request or PDN address allocation information sent by a UE. The fourth sending unit 902 is configured to allocate a PDN address capability for the UE according to the IP address acquisition request or the PDN address allocation information, and send the allocated PDN address capability to the UE.

If the PDN address allocation information includes an instruction that an IP address is required to be allocated for the UE or the fourth receiving unit 901 receives the IP address acquisition request, the network equipment further includes a fifth sending unit 903, configured to send the allocated IP address or an instruction of a manner of acquiring the IP address to the UE.

If the PDN address capability instructs that the UE is capable of further acquiring an IP address in a PDN connection, the network equipment further includes a sixth receiving unit 904, configured to receive a request of acquiring an IP address in the PDN connection initiated by the UE; and a sixth sending unit 905, configured to allocate the IP address or an instruction of a manner of acquiring the IP address for the UE.

The network equipment is a GGSN, the sixth receiving unit 904 includes a PDP context modification request receiving unit, configured to receive a Modify PDP Context Request message sent by the UE, in which the Modify PDP Context Request message includes IP address version information requested by the UE; and the sixth sending unit 905 includes a PDP context modification accept sending unit, configured to send a PDP context modification accept message to the UE, in which the message includes the IP address or the instruction of the manner of acquiring the IP address allocated for the UE.

The network equipment is a GGSN, the sixth receiving unit 904 includes a secondary PDP context activation request receiving unit, configured to receive an Activate Secondary PDP Context Request message sent by the UE, in which the Activate Secondary PDP Context Request message includes the IP address version information requested by the UE; and the sixth sending unit 905 includes a secondary PDP context activation accept sending unit, configured to send an Activate Secondary PDP Context Accept message to the UE, in which the Activate Secondary PDP Context Accept message includes the IP address or the instruction of the manner of acquiring the IP address allocated for the UE.

The network equipment is a P-GW, the sixth receiving unit 904 includes a first bearer resource allocation request receiving unit, configured to receive a bearer resource allocation request message sent by the UE, in which the bearer resource allocation request message includes the IP address version information requested by the UE; and the sixth sending unit 905 includes a bearer resource allocation response sending unit, configured to send a bearer resource allocation response message to the UE, in which the bearer resource allocation response message includes the IP address or the instruction of the manner of acquiring the IP address allocated for the UE.

The network equipment is a P-GW, the sixth receiving unit 904 includes a second bearer resource allocation request receiving unit, configured to receive a bearer resource allocation request message sent by the UE, in which the bearer resource allocation request message includes the IP address version information requested by the UE; and the sixth sending unit 905 includes a bearer update request sending unit, configured to send a bearer update request message to the UE, in which the bearer update request message includes the IP address or the instruction of the manner of acquiring the IP address allocated for the UE.

Persons of ordinary skill in the art should understand that all or a part of the steps of the method according to the embodiments of the present disclosure may be implemented by a program instructing relevant hardware such as a processor. The program may be stored in a computer readable storage medium. The storage medium may be a Read-Only Memory (ROM), a magnetic disk, or a Compact Disk Read-Only Memory (CD-ROM).

It will be apparent to persons skilled in the art that various modifications and variations can be made to the present disclosure without departing from the scope or spirit of the disclosure. In view of the foregoing, it is intended that the present disclosure cover modifications and variations of the present disclosure provided they fall within the scope of the following claims and their equivalents.

What is claimed is:

1. A method for providing Packet Data Network (PDN) address capability information to a user equipment (UE), comprising:
receiving, by a network equipment in a network, a first request for acquiring an Internet Protocol (IP) address in a PDN connection for the UE, wherein the first request comprises information of IP address version(s) supported by the UE;
determining, by the network equipment, PDN address capability according to the information of IP address version(s) supported by the UE, wherein the PDN address capability comprises IP address version(s) available to the UE and allowed by the network in the PDN connection; and
sending, by the network equipment, the PDN address capability to the UE to enable the UE to determine, according to the PDN address capability, whether to initiate a second request for acquiring an IP address in the PDN connection, wherein the UE does not initiate the second request if there is no remaining IP address version(s) available to the UE and allowed by the network in the PDN connection;
wherein the IP address version(s) available to the UE and allowed by the network in the PDN connection comprises:
all IP address version(s) available to the UE and allowed by the network in the PDN connection; or
remaining IP address version(s) available to the UE and allowed by the network in the PDN connection.

2. The method according to claim 1, wherein the method further comprises:
receiving, by the network equipment, the second request for acquiring an IP address in the PDN connection for the UE, wherein the second request comprises an IP address version, and the IP address version is one of the remaining IP address version(s) available to the UE and allowed by the network in the PDN connection;
allocating, by the network equipment, an IP address of the IP address version to the UE in response to the second request; and
sending, by the network equipment, the allocated IP address to the UE.

3. The method according to claim 2, wherein the receiving the second request comprises:
receiving, by the network equipment, a Modify Packet Data Protocol (PDP) Context Request message from the UE; and
wherein the sending the allocated IP address to the UE comprises:
sending, by the network equipment, a PDP context modification accept message to the UE, wherein the message comprises the allocated IP address.

4. The method according to claim 2, wherein the receiving the second request comprises:
receiving, by the network equipment, an Activate Secondary PDP Context Request message from the UE; and
wherein the sending the allocated IP address to the UE comprises:
sending, by the network equipment, an Activate Secondary PDP Context Accept message to the UE, wherein the Activate Secondary PDP Context Accept message comprises the allocated IP address.

5. The method according to claim 2, wherein the receiving the second request comprises:
receiving, by the network equipment, a bearer resource allocation request message from the UE; and
wherein the sending the allocated IP address to the UE comprises:
sending, by the network equipment, a bearer resource allocation response message to the UE, wherein the bearer resource allocation response message comprises the allocated IP address.

6. The method according to claim 2, wherein the receiving the second request comprises:
receiving, by the network equipment, a bearer resource allocation request message from the UE; and
wherein the sending the allocated IP address to the UE comprises:
sending, by the network equipment, a bearer update request message to the UE, wherein the bearer update request message comprises the allocated IP address.

7. A network equipment in a communication network, comprising a transceiver and a processor, wherein:
the transceiver is configured to receive a first request for acquiring an Internet Protocol (IP) address in a Packet Data Network (PDN) connection for a User Equipment (UE), wherein the first request comprises information of IP address version(s) supported by the UE; and
the processor is configured to determine PDN address capability according to the information of IP address version(s) supported by the UE, wherein the PDN address capability comprises IP address version(s) available to the UE and allowed by the network in the PDN connection;

and wherein the transceiver is further configured to send the PDN address capability to the UE to enable the UE to determine, according to the PDN address capability, whether to initiate a second request for acquiring an IP address in the PDN connection, wherein the UE does not initiate the second request if there is no remaining IP address version(s) available to the UE and allowed by the network in the PDN connection;

wherein the IP address version(s) available to the UE and allowed by the network in the PDN connection comprises:

all IP address version(s) available to the UE and allowed by the network in the PDN connection; or remaining IP address version(s) available to the UE and allowed by the network in the PDN connection.

8. The network equipment according to claim 7, wherein the transceiver is further configured to receive the second request for acquiring an IP address in the PDN connection for the UE, wherein the second request comprises an IP address version, and the IP address version is one of the remaining IP address version(s) available to the UE and allowed by the network in the PDN connection;

the processor is further configured to allocate an IP address of the IP address version to the UE in response to the second request; and the transceiver is further configured to send the allocated IP address to the UE.

9. The network equipment according to claim 8, wherein the second request is a Modify Packet Data Protocol (PDP) Context Request message from the UE; and wherein the transceiver sending the allocated IP address to the UE is configured to send to the UE a PDP context modification accept message comprising the allocated IP address.

10. The network equipment according to claim 8, wherein the second request is an Activate Secondary PDP Context Request message from the UE; and wherein the transceiver sending the allocated IP address to the UE is configured to send to the UE an Activate Secondary PDP Context Accept message comprising the allocated IP address.

11. The network equipment according to claim 8, wherein the second request is a bearer resource allocation request message from the UE; and wherein the transceiver sending the allocated IP address to the UE is configured to send to the UE a bearer resource allocation response message comprising the allocated IP address.

12. The network equipment according to claim 8, wherein the second request is a bearer resource allocation request message from the UE; and wherein the transceiver sending the allocated IP address to the UE is configured to send to the UE a bearer update request message comprising the allocated IP address.

13. The network equipment according to claim 7, wherein the network equipment is a Gateway GPRS Support Node (GGSN) or a Serving GPRS Support Node (SGSN) in a General Packet Radio Service/Universal Mobile Telecommunications System (GPRS/UMTS) network, or the network equipment is a Packet Data Network Gateway (P-GW) or a Mobility Management Entity (MME) in a evolved packet system (EPS) network.

14. A computer program product comprising a non-transitory computer readable storage medium storing program code thereon for use by a network equipment in a communication network, the program code comprising instructions for executing a method that comprises:

receiving a first request for acquiring an Internet Protocol (IP) address in a Packet Data Network (PDN) connection for a User Equipment (UE), wherein the first request comprises information of IP address version(s) supported by the UE;

determining PDN address capability according to the information of IP address version(s) supported by the UE, wherein the PDN address capability comprises IP address version(s) available to the UE and allowed by the network in the PDN connection; and sending the PDN address capability to the UE to enable the UE to determine, according to the PDN address capability, whether to initiate a second request for acquiring an IP address in the PDN connection, wherein the UE does not initiate the second request if there is no remaining IP address version(s) available to the UE and allowed by the network in the PDN connection;

wherein the IP address version(s) available to the UE and allowed by the network in the PDN connection comprises:

all IP address version(s) available to the UE and allowed by the network in the PDN connection; or remaining IP address version(s) available to the UE and allowed by the network in the PDN connection.

15. The computer program product according to claim 14, wherein the program code further comprises instructions for executing the method that further comprises:

receiving the second request for acquiring an IP address in the PDN connection for the UE, wherein the second request comprises an IP address version, and the IP address version is one of the remaining IP address version(s) available to the UE and allowed by the network in the PDN connection;

allocating an IP address of the IP address version to the UE in response to the second request; and sending the allocated IP address to the UE.

* * * * *